UNITED STATES PATENT OFFICE.

JOHN WAYMAN, OF COLLINSVILLE, ILLINOIS.

IMPROVEMENT IN COMPOSITIONS FOR PRESERVING BOLTING-CLOTHS.

Specification forming part of Letters Patent No. 183,350, dated October 17, 1876; application filed July 22, 1876.

*To all whom it may concern:*

Be it known that I, JOHN WAYMAN, of Collinsville, Madison county, Illinois, have invented a new and Improved Compound for the Preservation of Bolting-Cloths, of which the following is a specification:

The object of this invention is to prevent bolting-cloths from being destroyed by bugs, moths, or other insects.

The invention consists in a compound formed of wormwood, oil of cedar, gall, and tallow, in the proportions and manner hereinafter fully described.

In preparing my improved compound I take half a pound of wormwood, one ounce of oil of cedar, two beef-galls, and three pounds of tallow, and simmer them together for half an hour. This reduces the mixture to a kind of paste, which, when cold, is ready for use, or to be put up for market.

In using the compound it is put upon the ribs of the reel or bolt to which the bolting-cloth is applied, and upon the ticking upon which the bolting-cloth is made. This compound will keep insects away from the bolting-cloth, and thus prevent it from being injured by said insects.

Having thus described my invention, I claim as new and desire to secure by Letters Patent—

The compound formed of wormwood, oil of cedar, beef-galls, and tallow, in the proportions substantially as herein shown and described.

JOHN WAYMAN.

Witnesses:
 CHARLES NICKERL,
 JOS. CZERNEY.